US011481598B2

(12) United States Patent
Khapali et al.

(10) Patent No.: US 11,481,598 B2
(45) Date of Patent: Oct. 25, 2022

(54) AUTO SCALING A DISTRIBUTED PREDICTIVE ANALYTICS SYSTEM WITH MACHINE LEARNING

(71) Applicant: INTERNATIONAL BUSINESS MACHINES CORPORATION, Armonk, NY (US)

(72) Inventors: Mahadev Khapali, Bangalore (IN); Shashank V. Vagarali, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 941 days.

(21) Appl. No.: 15/822,439

(22) Filed: Nov. 27, 2017

(65) Prior Publication Data

US 2019/0164033 A1    May 30, 2019

(51) Int. Cl.
*G06N 3/04* (2006.01)
*G06N 3/063* (2006.01)
*G06N 3/08* (2006.01)

(52) U.S. Cl.
CPC ............. *G06N 3/04* (2013.01); *G06N 3/0635* (2013.01); *G06N 3/084* (2013.01)

(58) Field of Classification Search
CPC ......... G06N 3/04; G06N 3/0635; G06N 3/084
See application file for complete search history.

(56) References Cited

U.S. PATENT DOCUMENTS

| | | | |
|---|---|---|---|
| 8,738,860 B1 * | 5/2014 | Griffin | G06F 12/0897 711/122 |
| 9,356,883 B1 | 5/2016 | Borthakur | |
| 2008/0222646 A1 * | 9/2008 | Sigal | G06F 9/505 718/105 |
| 2015/0006711 A1 | 1/2015 | Schaad | |
| 2016/0048415 A1 | 2/2016 | Sarma et al. | |
| 2016/0142265 A1 | 5/2016 | Dube et al. | |

(Continued)

OTHER PUBLICATIONS

S. Spinner et al., "Runtime vertical scaling of virtualized applications via online model estimation," in Proc. IEEE 8th Int. Conf. Self-Adaptive Self-Organizing Syst., Sep. 2014, pp. 157-166. (Year: 2014).*

(Continued)

*Primary Examiner* — Kamran Afshar
*Assistant Examiner* — Marshall L Werner
(74) *Attorney, Agent, or Firm* — Cantor Colburn LLP; Steven Bouknight

(57) ABSTRACT

A computer-implemented method for creating an auto-scaled predictive analytics model includes determining, via a processor, whether a queue size of a service master queue is greater than zero. Responsive to determining that the queue size is greater than zero, the processor fetches a count of requests in a plurality of requests in the service master queue and a type for each of the requests. The processor derives a value for time required for each of the requests and retrieves a number of available processing nodes based on the time required for each of the requests. The processor then auto-scales a processing node number responsive to determining that a total execution time for all of the requests in the plurality of requests exceeds a predetermined time value and outputs an auto-scaled predictive analytics model based on the processing node number and queue size.

15 Claims, 8 Drawing Sheets

(56) References Cited

U.S. PATENT DOCUMENTS

2016/0269908 A1* 9/2016 Richards ............ G06Q 30/0248
2016/0321115 A1* 11/2016 Thorpe .............. G06Q 10/0631

OTHER PUBLICATIONS

X. Guo, Y. Cao, and J. Tao, "SVIS: Large scale video data ingestion into big data platform," Database Systems for Advanced Applications, A. Liu et al., eds. Berlin, Germany: Springer, 2015, pp. 300-306. (Year: 2015).*

S. Spinner et al., "Runtime Vertical Scaling of Virtualized Applications via Online Model Estimation," 2014 IEEE Eighth International Conference on Self-Adaptive and Self-Organizing Systems, London, UK, 2014, pp. 157-166, (Year: 2014).*

X. Guo, Y. Cao, and J. Tao, "SVIS: large scale video data ingestion into big data platform," in International Conference on Database Systems for Advanced Applications, pp. 300-306, 2015: Springer. (Year: 2015).*

Guo et al., SVIS: Large Scale Video Data Ingestion into Big Data Platform, Database Systems for Advanced Applications, pp. 300-306, Apr. 2015. (Year: 2015).*

Spinner et al., Runtime Vertical Scaling of Virtualized Applications via Online Model Estimation, 2014 IEEE 8th International Conference on Self-Adaptive and Self-Organizing Systems, pp. 157-166, 2014. (Year: 2014).*

* cited by examiner $$f = g(s,v)v$$  EQUATION [1]

$$\frac{\partial s(t)}{\partial t} = f(s,v)$$  EQUATION [2]

AUTO SCALING A DISTRIBUTED PREDICTIVE ANALYTICS SYSTEM WITH MACHINE LEARNING

BACKGROUND

The present invention relates to predictive analytics, and more particularly to an auto-scaling distributed predictive analytics system with machine learning.

In business, predictive analytics is an area of data mining that deals with machine extraction of information from data and using it to predict trends and behavior patterns. Often the unknown event of interest is in the future, but predictive analytics can be applied to any type of unknown whether it be in the past, present or future. For example, predictive analytics are deployable for identifying suspects after a crime has been committed, or for identifying credit card fraud as it occurs. The core of predictive analytics relies on capturing relationships between explanatory variables and the predicted variables from past occurrences and exploiting them to predict the unknown outcome. It is important to note, however, that the accuracy and usability of results will depend greatly on the level of data analysis and the quality of assumptions. Current systems do not perform predictive data analysis by scaling input data sources and intelligently deriving data sets that dynamically change. Machine learning systems may significantly increase the quality of assumptions made by the processing circuitry.

"Machine learning" is used to broadly describe a primary function of electronic systems that learn from data. In machine learning and cognitive science, ANNs are a family of statistical learning models inspired by the biological neural networks of animals, and in particular the brain. ANNs may be used to estimate or approximate systems and functions that depend on a large number of inputs and are generally unknown.

ANNs are often embodied as so-called "neuromorphic" systems of interconnected processor elements that act as simulated "neurons" and exchange "messages" between each other in the form of electronic signals. Similar to the so-called "plasticity" of synaptic neurotransmitter connections that carry messages between biological neurons, the connections in ANNs that carry electronic messages between simulated neurons are provided with numeric weights that correspond to the strength or weakness of a given connection. The weights can be adjusted and tuned based on experience, making ANNs adaptive to inputs and capable of learning. For example, an ANN for handwriting recognition is defined by a set of input neurons which may be activated by the pixels of an input image. After being weighted and transformed by a function determined by the network's designer, the activations of these input neurons are then passed to other downstream neurons, which are often referred to as "hidden" neurons. This process is repeated until an output neuron is activated. The activated output neuron determines which character was read.

Crossbar arrays, also known as crosspoint arrays or crosswire arrays, are high density, low cost circuit architectures used to form a variety of electronic circuits and devices, including ANN architectures, neuromorphic microchips and ultra-high density nonvolatile memory. A basic crossbar array configuration includes a set of conductive row wires and a set of conductive column wires formed to intersect the set of conductive row wires. The intersections between the two sets of wires are separated by so-called crosspoint devices, which may be formed from thin film material.

Crosspoint devices, in effect, function as the ANN's weighted connections between neurons. Nanoscale two-terminal devices, for example memristors having "ideal" conduction state switching characteristics, are often used as the crosspoint devices in order to emulate synaptic plasticity with high energy efficiency. The conduction state (e.g., resistance) of the ideal memristor material may be altered by controlling the voltages applied between individual wires of the row and column wires. Digital data may be stored by alteration of the memristor material's conduction state at the intersection to achieve a high conduction state or a low conduction state. The memristor material can also be programmed to maintain two or more distinct conduction states by selectively setting the conduction state of the material. The conduction state of the memristor material can be read by applying a voltage across the material and measuring the current that passes through the target crosspoint device.

In order to limit power consumption, the crosspoint devices of ANN chip architectures are often designed to utilize offline learning techniques, wherein the approximation of the target function does not change once the initial training phase has been resolved. Offline learning allows the crosspoint devices of crossbar-type ANN architectures to be simplified such that they draw very little power.

Notwithstanding the potential for lower power consumption, executing offline training for scaling predictive analytics systems without machine learning technology can be difficult and resource intensive because it is typically necessary during training to modify a significant number of adjustable parameters (e.g., weights).

SUMMARY

Embodiments of the present invention are directed to a computer-implemented method for creating an auto-scaled predictive analytics model. The method includes determining, via a processor, whether a queue size of a service master queue is greater than zero. Responsive to determining that the queue size is greater than zero, the processor fetches a count of requests in a plurality of requests in the service master queue, and a type for each of the requests. The processor derives a value for the time required for each of the requests and retrieves a number of available processing nodes based on the time required for each of the requests. The processor then auto-scales a processing node number responsive to determining that a total execution time for all of the requests in the plurality of requests exceeds a predetermined time value and outputs an auto-scaled predictive analytics model based on the processing node number and queue size.

According to other embodiments, a system and computer program product for creating an auto-scaled predictive analytics model are also included herein.

DETAILED DESCRIPTION

Figure 1:
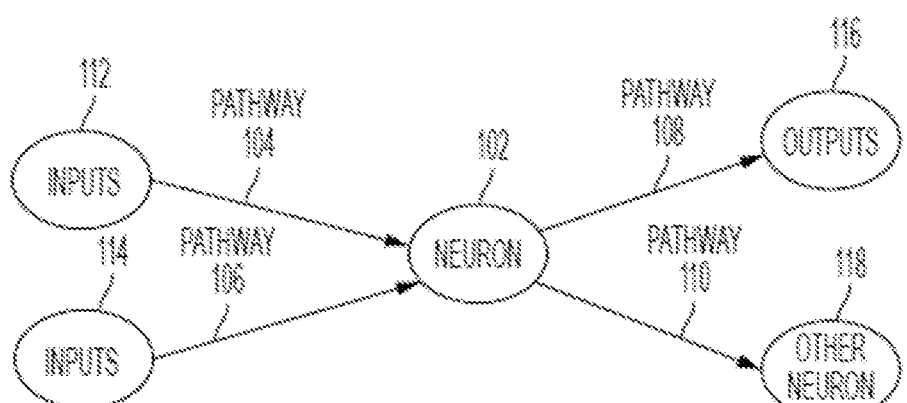
FIG. 1 depicts a simplified diagram of input and output connections of a biological neuron.

Known methods of predictive analytics typically follow a flow that includes ingesting of data, the preparation of the data, training the model, evaluating the model, then deploying the model. This method for predictive analytics system may not be, in some situations, concurrent, distributed, and fault tolerant. One architecture known as the Actor-Model architecture may provide a more robust and concurrent analysis. Using the Actor-Model architecture, each of the above stages of predictive analytics can be created as a separate micro service to do the respective work. In turn, each micro-service will have the master workflow. Using the Actor-Model architecture, a request would come to the master node and the master node then queues the request. Next, the processing node (i.e., the ingestion processing node) operates on the "pull model," which means that the processing node checks the master queue if there is a request in the queue. If there is a request in the queue, the processing node pulls that work for further processing. After successful processing of the request, the processing node acknowledges the work done to the master node.

One problem with the Actor-Model architecture is demonstrated with the following scenario: Considering, now, that two ingestion processing nodes are available to process the request. The amount of time taken to process each request depends on two disparate factors: first the type of data available as a data source, and second, the amount of data available to process the request. Now, if there is sudden surge in the number of input requests, there will exist a need to increase the capacity of the system, which involves increasing the number of processing nodes. If not, the request may not be served and processed because the request could time out. The timeout factor is based on the default timeout set for the ingestion service.

It is beneficial to provide a system that intelligently auto-scales up new processing nodes based on several factors that dynamically change. For example, it is beneficial to provide a system that scales up a number of existing processing nodes in the system, and the type of data-sources and amount of data to be processed. It is also beneficial to provide a system that intelligently, with machine learning, derives the amount of time taken by each type of request and automatically scales up or down the time-out setting.

It is understood in advance that although one or more embodiments are disclosed in the context of biological neural networks with a specific emphasis on modeling brain structures and functions, implementation of the teachings recited herein are not limited to modeling a particular environment. Rather, embodiments of the present disclosure are capable of modeling any type of environment, including for example, weather patterns, arbitrary data collected from the internet, and the like, as long as the various inputs to the environment can be turned into a vector.

Although the present disclosure is directed to an electronic system, for ease of reference and explanation various aspects of the disclosed electronic system are described using neurological terminology such as neurons, plasticity and synapses, for example. It will be understood that for any discussion or illustration herein of an electronic system, the use of neurological terminology or neurological shorthand notations are for ease of reference and are meant to cover the neuromorphic, ANN equivalent(s) of the described neurological function or neurological component.

ANNs, also known as neuromorphic or synaptronic systems, are computational systems that can estimate or approximate other functions or systems, including, for example, biological neural systems, the human brain and brain-like functionality such as image recognition, speech recognition and the like. ANNs incorporate knowledge from a variety of disciplines, including neurophysiology, cognitive science/psychology, physics (statistical mechanics), control theory, computer science, artificial intelligence, statistics/mathematics, pattern recognition, computer vision, parallel processing and hardware (e.g., digital/analog/VLSI/optical).

Instead of utilizing the traditional digital model of manipulating zeros and ones, ANNs create connections between processing elements that are substantially the functional equivalent of the core system functionality that is being estimated or approximated. For example, IBM's SyNapse computer chip is the central component of an electronic neuromorphic machine that attempts to provide similar form, function and architecture to the mammalian brain. Although the IBM SyNapse computer chip uses the same basic transistor components as conventional computer chips, its transistors are configured to mimic the behavior of neurons and their synapse connections. The IBM SyNapse computer chip processes information using a network of just over one million simulated "neurons," which communicate with one another using electrical spikes similar to the synaptic communications between biological neurons. The IBM SyNapse architecture includes a configuration of processors (i.e., simulated "neurons") that read a memory (i.e., a simulated "synapse") and perform simple operations. The communications between these processors, which are typically located in different cores, are performed by on-chip network routers.

Figure 2:
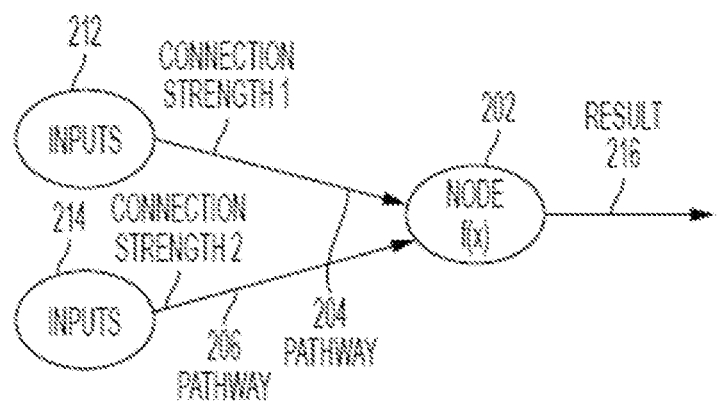
FIG. 2 depicts a known simplified model of the biological neuron shown in FIG. 1.
Figure 3:
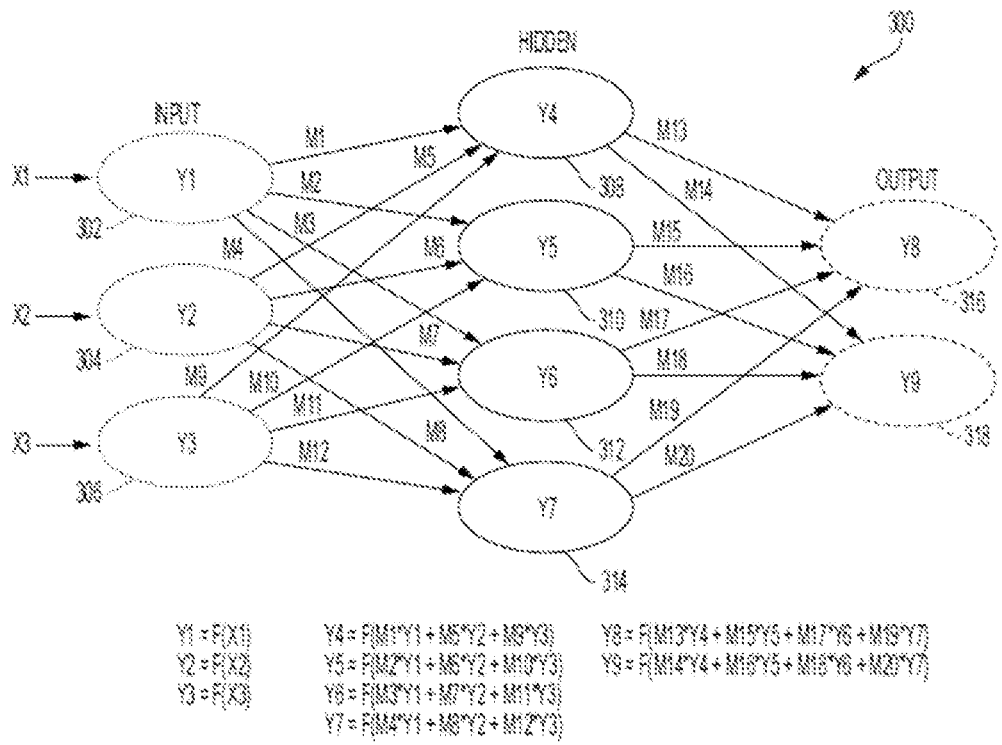
FIG. 3 depicts a known simplified model of an ANN incorporating the biological neuron model shown in FIG. 2.

As background, a general description of how a typical ANN operates will now be provided with reference to FIGS. 1, 2 and 3. As previously noted herein, a typical ANN models the human brain, which includes about one hundred billion interconnected cells called neurons. FIG. 1 depicts a simplified diagram of a biological neuron 102 having pathways 104, 106, 108, 110 that connect it to upstream inputs 112, 114, downstream output s116 and downstream "other" neurons 118, configured and arranged as shown. Each biological neuron 102 sends and receives electrical impulses through pathways 104, 106, 108, 110. The nature of these electrical impulses and how they are processed in biological neuron 102 are primarily responsible for overall brain functionality. The pathway connections between biological neurons can be strong or weak. When a given neuron receives input impulses, the neuron processes the input according to the neuron's function and sends the result of the function to downstream outputs and/or downstream "other" neurons.

Biological neuron 102 is modeled in FIG. 2 as a node 202 having a mathematical function, f(x) depicted by the equation shown in FIG. 2. Node 202 takes electrical signals from inputs 212, 214, multiplies each input 212, 214 by the strength of its respective connection pathway 204, 206, takes a sum of the inputs, passes the sum through a function, f(x), and generates a result 216, which may be a final output or an input to another node, or both. In the present disclosure, an asterisk (*) is used to represent a multiplication. Weak input signals are multiplied by a very small connection strength number, so the impact of a weak input signal on the function is very low. Similarly, strong input signals are multiplied by a higher connection strength number, so the impact of a strong input signal on the function is larger. The function f(x) is a design choice, and a variety of functions can be used. A typical design choice for f(x) is the hyperbolic tangent function, which takes the function of the previous sum and outputs a number between minus one and plus one.

FIG. 3 depicts a simplified ANN model 300 organized as a weighted directional graph, wherein the artificial neurons are nodes (e.g., 302, 308, 316), and wherein weighted directed edges (e.g., m1 to m20) connect the nodes. ANN model 300 is organized such that nodes 302, 304, 306 are input layer nodes, nodes 308, 310, 312, 314 are hidden layer nodes and nodes 316, 318 are output layer nodes. Each node is connected to every node in the adjacent layer by connection pathways, which are depicted in FIG. 3 as directional arrows having connection strengths m1 to m20. Although only one input layer, one hidden layer and one output layer are shown, in practice, multiple input layers, hidden layers and output layers may be provided.

Similar to the functionality of a human brain, each input layer node 302, 304, 306 of the simplified ANN model 300 receives inputs x1, x2, x3 directly from a source (not shown) with no connection strength adjustments and no node summations. Accordingly, y1=f(x1), y2=f(x2) and y3=f(x3), as shown by the equations listed at the bottom of FIG. 3. Each hidden layer node 308, 310, 312, 314 receives its inputs from all input layer nodes 302, 304, 306 according to the connection strengths associated with the relevant connection pathways. Thus, in hidden layer node 308, y4=f(m1*y1+m5*y2+m9*y3), wherein * represents a multiplication. A similar connection strength multiplication and node summation is performed for hidden layer nodes 310, 312, 314 and output layer nodes 316, 318, as shown by the equations defining functions y5 to y9 depicted at the bottom of FIG. 3.

ANN model 300 processes data records one at a time, and it "learns" by comparing an initially arbitrary classification of the record with the known actual classification of the record. Using a training methodology knows as "backpropagation" (i.e., "backward propagation of errors"), the errors from the initial classification of the first record are fed back into the network and used to modify the network's weighted connections the second time around, and this feedback process continues for many iterations. In the training phase of an ANN, the correct classification for each record is known, and the output nodes can therefore be assigned "correct" values. For example, a node value of "1" (or 0.9) for the node corresponding to the correct class, and a node value of "0" (or 0.1) for the others. It is thus possible to compare the network's calculated values for the output nodes to these "correct" values, and to calculate an error term for each node (i.e., the "delta" rule). These error terms are then used to adjust the weights in the hidden layers so that in the next iteration the output values will be closer to the "correct" values.

There are many types of neural networks, but the two broadest categories are feed-forward and feedback/recurrent networks. ANN model 300 is a non-recurrent feed-forward network having inputs, outputs and hidden layers. The signals can only travel in one direction. Input data is passed onto a layer of processing elements that perform calculations. Each processing element makes its computation based upon a weighted sum of its inputs. The new calculated values then become the new input values that feed the next layer. This process continues until it has gone through all the layers and determined the output. A threshold transfer function is sometimes used to quantify the output of a neuron in the output layer.

A feedback/recurrent network includes feedback paths, which mean that the signals can travel in both directions using loops. All possible connections between nodes are allowed. Because loops are present in this type of network, under certain operations, it may become a non-linear dynamical system that changes continuously until it reaches a state of equilibrium. Feedback networks are often used in associative memories and optimization problems, wherein the network looks for the best arrangement of interconnected factors.

The speed and efficiency of machine learning in feed-forward and recurrent ANN architectures depend on how effectively the crosspoint devices of the ANN crossbar array perform the core operations of typical machine learning algorithms. Although a precise definition of machine learning is difficult to formulate, a learning process in the ANN context can be viewed as the problem of updating the crosspoint device connection weights so that a network can efficiently perform a specific task. The crosspoint devices typically learn the necessary connection weights from available training patterns. Performance is improved over time by iteratively updating the weights in the network. Instead of following a set of rules specified by human experts, ANNs "learn" underlying rules (like input-output relationships) from the given collection of representative examples. Accordingly, a learning algorithm may be generally defined as the procedure by which learning rules are used to update and/or adjust the relevant weights.

The three main learning algorithm paradigms are supervised, unsupervised and hybrid. In supervised learning, or learning with a "teacher," the network is provided with a correct answer (output) for every input pattern. Weights are determined to allow the network to produce answers as close as possible to the known correct answers. Reinforcement learning is a variant of supervised learning in which the network is provided with only a critique on the correctness of network outputs, not the correct answers themselves. In contrast, unsupervised learning, or learning without a teacher, does not require a correct answer associated with each input pattern in the training data set. It explores the underlying structure in the data, or correlations between patterns in the data, and organizes patterns into categories from these correlations. Hybrid learning combines supervised and unsupervised learning. Parts of the weights are usually determined through supervised learning, while the others are obtained through unsupervised learning. Additional details of ANNs and learning rules are described in Artificial Neural Networks: A Tutorial, by Anil K. Jain, Jianchang Mao and K. M. Mohiuddin, IEEE, March 1996, the entire disclosure of which is incorporated by reference herein.

As previously noted herein, in order to limit power consumption, the crosspoint devices of ANN chip architectures are often designed to utilize offline learning techniques, wherein the approximation of the target function does not change once the initial training phase has been resolved.

Offline learning allows the crosspoint devices of crossbar-type ANN architectures to be simplified such that they draw very little power.

Figure 4:
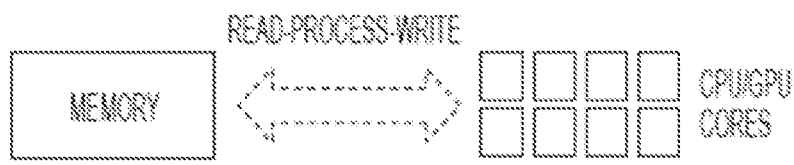
FIG. 4 depicts a simplified block diagram of a known weight update methodology.

Notwithstanding the potential for lower power consumption, executing offline training can be difficult and resource intensive because it is typically necessary during training to modify a significant number of adjustable parameters (e.g., weights) in the ANN model to match the input-output pairs for the training data. FIG. 4 depicts a simplified illustration of a typical read-process-write weight update operation, wherein CPU/GPU cores (i.e., simulated "neurons") read a memory (i.e., a simulated "synapse"), perform weight update processing operations, and then write the updated weights back to memory. Accordingly, simplifying the crosspoint devices of ANN architectures to prioritize power-saving, offline learning techniques typically means that training speed and training efficiency are not optimized.

Providing simple crosspoint devices that keep power consumption within an acceptable range, as well as accelerate the speed and efficiency of training ANN architectures, would improve overall ANN performance and allow a broader range of ANN applications.

One or more embodiments are directed to a computer-implemented method for creating an auto-scaled predictive analytics model. According to some embodiments, a two-terminal programmable resistive crosspoint component referred to herein as a resistive processing unit (RPU), which provides local data storage functionality and local data processing functionality, may perform auto scaling and predictive analytics. In other words, when performing data processing, the system may process auto-scaling operations by updating the value stored at each RPU in parallel and locally, which eliminates the need to move relevant data in and out of a processor and a separate storage element. Additionally, the local data storage and local data processing provided by the disclosed two-terminal RPUs accelerate the ANN'S ability to learn and implement algorithms such as backpropagating online neural network training, matrix inversion, matrix decomposition and the like. Accordingly, implementing a machine learning ANN architecture having the disclosed RPU enables the implementation of online machine learning capabilities that optimize the speed, efficiency and power consumption of learning. The disclosed RPU and resulting ANN architecture improve overall ANN performance and enable a broader range of practical ANN applications.

The disclosed RPU may be implemented as two-terminal resistive cross point devices, wherein their switching characteristics have a non-linearity that can be used for processing data. Thus, the disclosed RPU may be implemented by any two-terminal device having an appropriate non-linear characteristic that may be used to perform calculations in an ANN. For example, the disclosed RPU device may be implemented with resistive random access memory (RRAM), phase change memory (PCM), programmable metallization cell (PMC) memory, non-linear memristive systems, or any other two-terminal device that has non-linear resistive switching characteristics.

Prior to a more detailed description of the disclosed RPU, an overview of systolic arrays, stochastic computing, linear memristor devices, and non-linear memristor devices, which are relevant to the present disclosure, will now be provided. Systolic arrays are composed of parallel processing elements (PE) that attempt to accelerate the learning of certain highly used algorithms. Systolic arrays are often hard-wired for specific operations, such as "multiply and accumulate," to perform massively parallel integration, convolution, correlation, matrix multiplication or data sorting tasks. In a publication by C. Lehmann et al., titled "A Generic Systolic Array Building Block For Neural Networks with On-Chip Learning," IEEE Transactions On Neural Networks, Vol. 4, No. 3, May 1993, it is proposed to use systolic arrays as a building block for online learning neural networks, wherein each PE in the systolic array has local storage to store a single weight value and is capable of performing computations necessary for matrix multiplication and weight updates. The very-large-scale integration (VLSI) implementation of the PE described in the Lehmann article requires approximately 1800 transistors per PE, which increases power consumption and decreases scalability. It is therefore desirable to provide PEs that requires as few transistors per PE as possible.

Figures 5, 6:
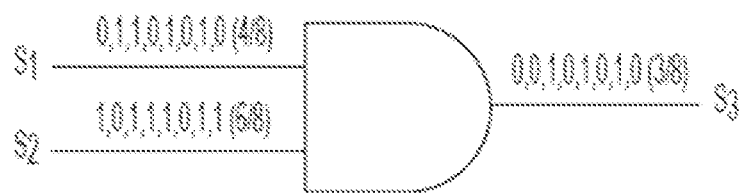
FIG. 5 depicts a simplified block diagram of a stochastic computing methodology capable of being used in one or more embodiments.
FIG. 6 depicts known equations that govern the operation of a passive, two-terminal memristor.

Stochastic computing is a collection of techniques that represent continuous values by streams of random bits, wherein complex computations can be computed by simple bit-wise operations on the streams. Specifically, if there are two random and independent bit streams $S_1$, $S_2$ called stochastic numbers (i.e., a Bernoulli process), wherein the probability of a "one" in the first stream is p, and the probability of a "one" in the second stream is q, the logical AND of the two streams can be taken as shown in FIG. 6. The probability of a "one" in the output stream is pq. By observing enough output bits and measuring the frequency of "ones," it is possible to estimate IN pq to arbitrary accuracy. Because of the design simplicity of these so-called "multiply and accumulate" operations, which can be implemented with a few logic gates/transistors, stochastic computing is often used in the hardware design for neural networks. A publication by V. K. Chippa et al. titled "StoRM: A Stochastic Recognition and Mining Processor," Proceedings of the 2014 International Symposium On Low power Electronics and Design, shows an application of stochastic computing to two-dimensional (2D) systolic arrays that can be used as a hardware accelerator for neural network training algorithms.

The term "memristor" is used to describe a passive two-terminal electrical component, wherein the resistance value of the device depends on the history of the voltages that have previously been applied to the device. The operation of a memristor is governed by Equations [1] and [2] shown in FIG. 6, wherein i is the current passing through the device, v is the voltage applied to the device, g is the conductance value of the device (which is the inverse of the resistance), s is the internal state variable of the device that controls the conductance value and f is the function that shows the time evolution of the internal state variable s. In a publication by Chua, L. O., titled "Resistance Switching Memories are Memristors," Applied Physics A (2011), 102 (4): 765-783, memristor functionality is proposed for the operation of resistive memory devices such as resistive random-access-memory (RRAM), phase change memory (PCM) and conductive-bridging random-access-memory (CBRAM). Because a memristor device remembers its history (i.e., the so-called "non-volatility property"), the Chua article proposes such devices as possible alternatives for non-volatile memory technologies.

A publication by D. Soudry et al., titled "Memristor-Based Multilayer Neural Networks With Online Gradient Descent Training," IEEE Transactions On Neural Networks and Learning Systems (2015), proposes the use of memristors for back-propagating neural network training hardware. However, the Soudry et al article assumes an ideal memristor operation, wherein the change in resistance is linear with respect to the voltage applied to the device. The Soudry et al. design assumed that the function ƒ(s,v) in Equation [2] of FIG. 6 is a simple function given by the relationship ƒ(s,v)=v. The Soudry et al. article proposes an architecture that is similar to a 2D systolic array as described above, wherein each crosspoint is implemented with an ideal memristor and a pair of transistors. In the Soudry et al. article, the memristor is in effect used to store the weight value, and the pair of transistors is used to compute a local multiplication operation that is needed for the weight updates, wherein the result of the weight update modifies the memristor's conduction state. The Soudry et al. article discloses, in effect, a four terminal device composed of a memristor and two transistors, which are used to make a 2D array of the 4 terminal devices in order to implement the backpropagation training of the neural network hardware.

Figure 7:
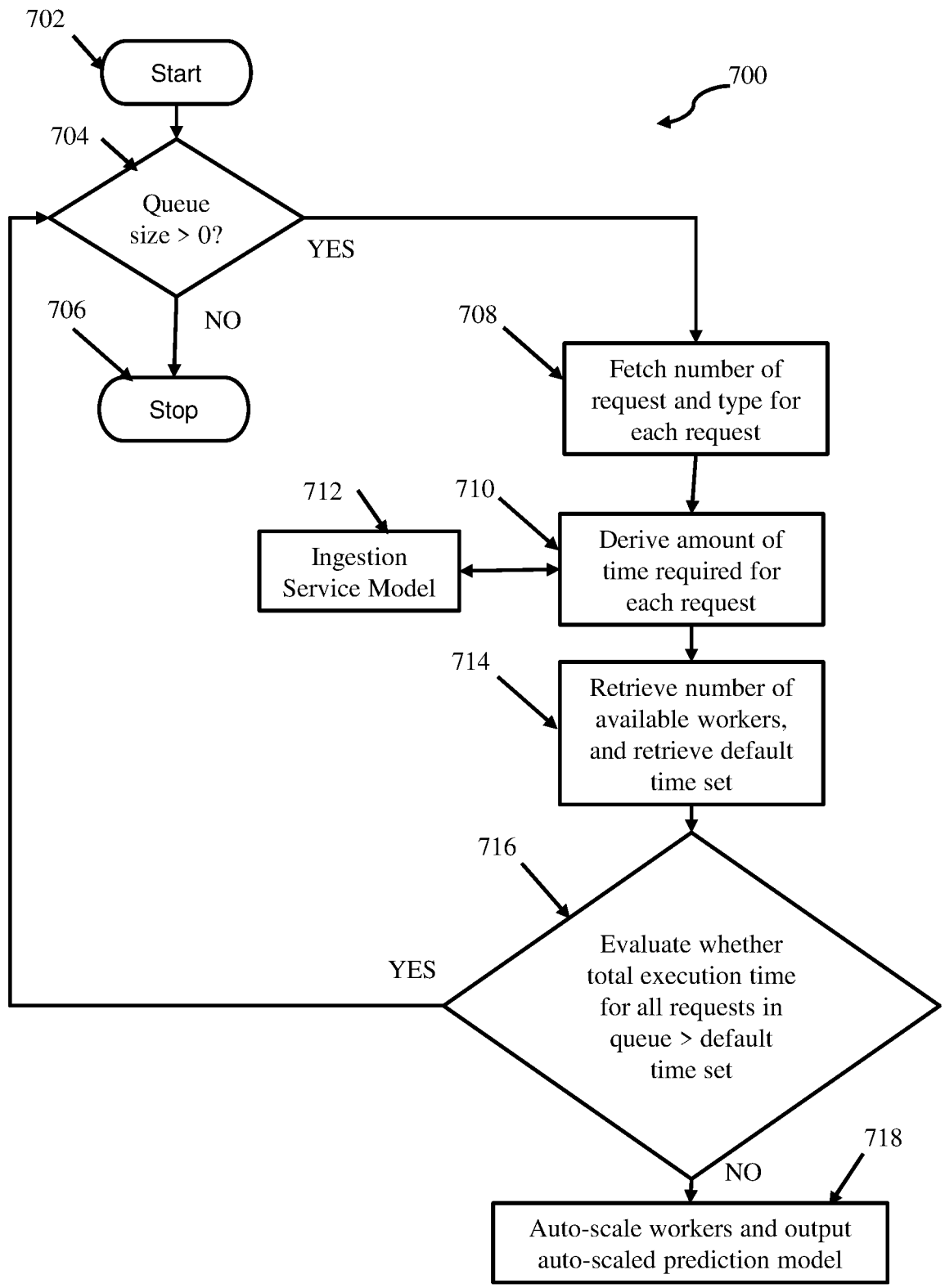
FIG. 7 depicts a method for automatically scaling a distributed predictive analytics system according to one embodiment.
Figure 8:
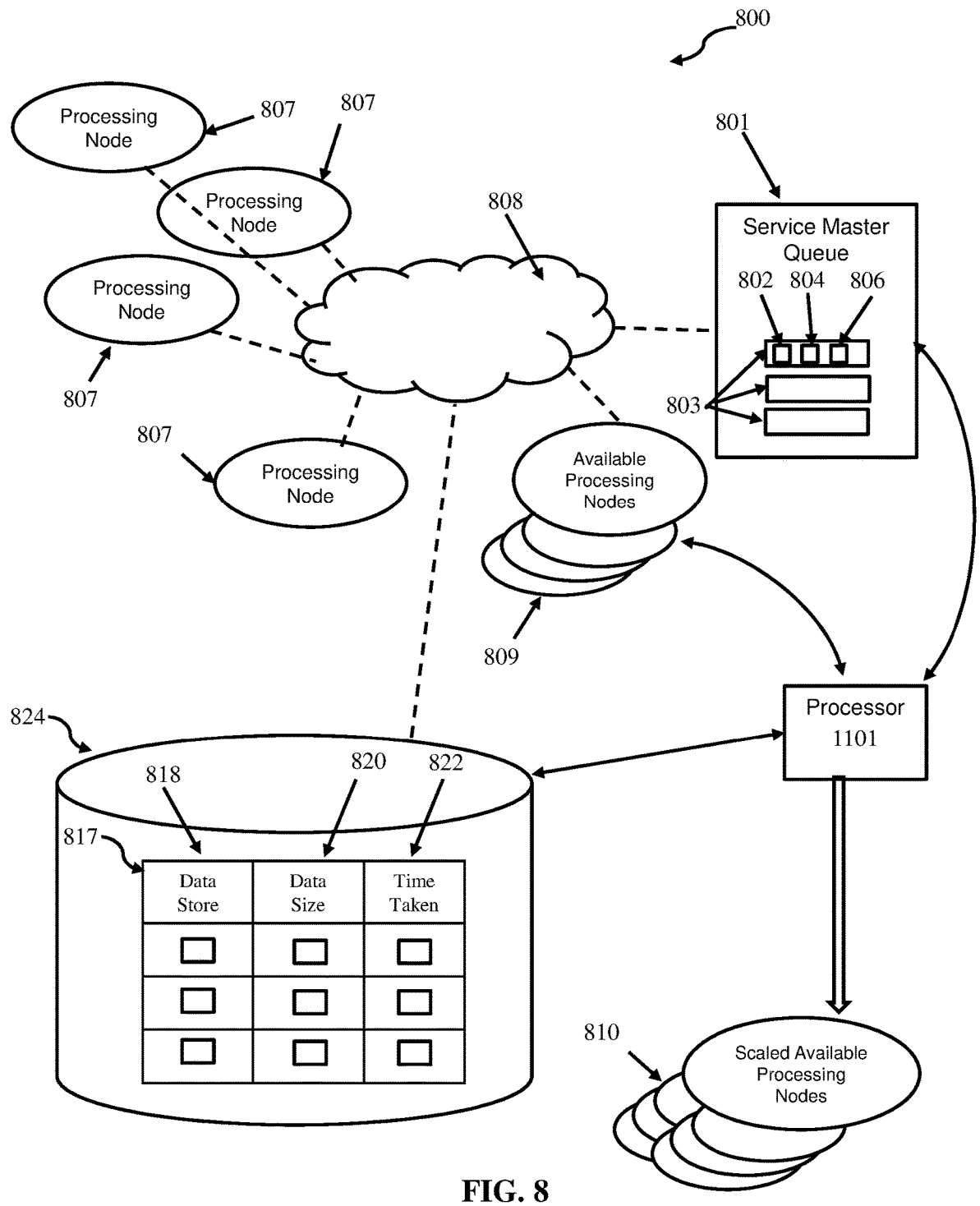
FIG. 8 depicts an exemplary computing environment for scaling a distributed predictive analytics system according to one embodiment.

Turning now to a more detailed description of the present disclosure, FIG. 7 depicts a method for automatically scaling a distributed predictive analytics system with machine learning ANN as described above, according to one embodiment. FIG. 8 depicts an exemplary computing environment for scaling a distributed predictive analytics system with a machine learning algorithm, according to embodiments of the present invention.

Although FIGS. 7 and 8 will be considered together, we turn first to FIG. 8 for an overview of a computing environment 800 for practicing embodiments of the present invention. Looking first at FIG. 8, a service master queue 801 is shown processing a plurality of requests 803. Each of the requests 803 in the service master queue 801 includes information about the particular queue such as, for example, a request number 802, a time estimation value 804 for processing the request, and a type of request 806. In some aspects, the service master queue 801 could be empty. An example of an empty queue would be the service master queue 801 having no requests (e.g., without requests 803) populating the service master queue 801. In the present example, the service master queue 801 includes 3 services (or requests) in the queue. Those skilled in the art appreciate that any number of requests are contemplated.

The service master queue is operatively connected to a plurality of processing nodes 807 and 809 via a network 808. As described in greater detail hereafter, the processor 1101, which is operatively connected to the service master queue 801 and the plurality of processing nodes 807, 809, instantiates an auto-scaling daemon, auto-scales a plurality of available processing nodes 809 based on an ingestion service model database 817 stored in an operatively connected memory 824, and outputs a plurality of scaled available processing nodes 810 that can accommodate the requests 803 in the service master queue 801. The memory 824 may be, for example, cloud-based storage, a local database store, etc. The processor 1101 continually improves itself by refining the time estimate using back-propagation, and updating the information in the ingestion service model database 817. The information that is updated by the processor 1101 includes, for example, information pertaining to data stores 818, data sizes 820 indicative of the data volume a particular data stores can accommodate, and time taken 822 (which is, for example, a continually-updated record of historical times) for processing items in each respective data store 818.

Figure 11:
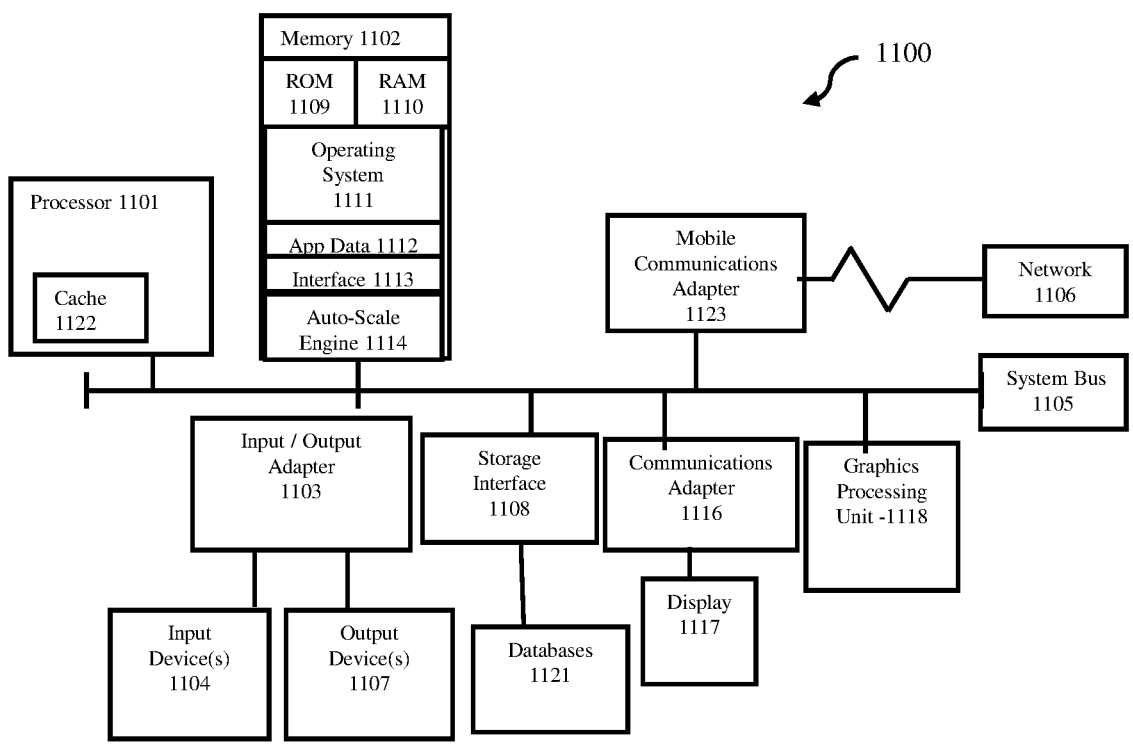
FIG. 11 depicts a block diagram of a computer system and environment according to one embodiment.

Referring again to FIG. 7, as an initial starting step 702, a system processor (for example, processor 1101 as depicted in FIG. 8) starts the daemon, which is an auto-scale engine 1114 (FIG. 11, described hereafter). The auto-scale engine 1114 is self-updating using the machine learning algorithm on the ANN (processor 1101). In some aspects, the auto-scale engine 1114 is instantiated by the processor 1101 as a machine learning algorithm on an ANN.

At decision block 704, the processor 1101 determines whether the size of the service master queue 801 is greater than zero. A service master queue 801 that has a size of zero indicates that there are no requests in the service master queue 801. As depicted in FIG. 8, the service master queue 801 is shown with three requests 803 in the queue. If, at decision block 704, the processor determines that the queue is not greater than zero, the method 700 stops at block 706.

As shown in block 708, when the service master queue 801 size is greater than zero (as shown in the embodiment depicted in FIG. 8), the processor 1101 fetches the request number 802 for each respective request in the service master queue 801. The request number 802 identifies each respective request in the service master queue 801. An example of a request type is, for example, "ingest request from data store xyz 700 MB." As shown in decision block 710, the processor 1101 derives an amount of time 804 required for each respective request number 802. According to some embodiments, the processor 1101 is an ANN that uses a neural network training algorithm as described above, and derives the values for an amount of processing time required for all requests made. The processor 1101, via a neural network (ANN), derives the values by retrieving, from an operatively connected memory 824, the time required to process a particular request in the service master queue 801. The time required to process the request may change based on the particular data store 818, the data size of the request in comparison with the total available data size 820 for the respective data store, and the time taken (an expected time estimate) based on historical iterations that are compared by processor 1101 to actual times taken to process similar requests, which are then updated to the time taken 822 over time. Requests are similar when they share one or more of a particular size, a particular processing operation, and requests a particular data store compared to another request.

The deriving is iterative and self-improving in that the processor 1101 estimates the time required for processing that particular request, evaluates the actual time taken in an iteration, and updates the back-propagation algorithm and time take record 822. According to one embodiment, the processor 1101 retrieves a stored processing time value for each request, which is saved in the ingestion service model database 817. After retrieving the stored value required for each of the requests, the processor 1101 evaluates a sum total of the time required (i.e., a total execution time) for executing the requests, and determines whether the operational capacity of the processing nodes is adequate to process all requests in the queue. Because loops are present in this type of network, under certain operations, the computing environment 800 is operational as a non-linear dynamical system that changes continuously until it reaches a state of equilibrium such that the processor 1101 auto-scales the available processing nodes without over-scaling the allocated processing nodes, and at the same time not under-scaling the processing nodes such that the requests 803 in the service master queue 801 time out during processing because an inadequate number of processing nodes were assigned to perform the processing.

At block 714, the processor 1101 retrieves the number of available processing nodes, from the connected memory 824, and retrieves a default (predetermined) time set for each respective request. The predetermined time set is continually updated by the processor 1101.

As shown in decision block 716, the processor 1101, running the intelligent auto-scale up algorithm evaluates whether a total execution time (a sum of time 804) for all request numbers 802 in the service master queue 801 is greater than a default set time. Accordingly, the processor 1101 retrieves a predetermined default set time (e.g., time taken 822) stored in the database memory 824, sums all of the times 804 for all of the request numbers 802 in the service master queue 801, and compares the times 804 to the predetermined default time stored in the ingestion service model database 817. If all of the requests in the service master queue 801 can be processed (because the total sum of all the times 804 for all of the request numbers 802 is greater than the default set time), then the processor proceeds back to the decision block 704 for continued iterative processing. If the total time is greater than the default set time, as shown in block 718, the processor 1101 auto-scales the processing nodes by increasing or decreasing the processing nodes (block 814 in FIG. 8) and outputs an auto-scaled prediction model. The auto-scaled prediction model includes a scaled number of processing nodes 810 (as shown in FIG. 8) required to accomplish all of the tasks in the service master queue 801.

The processor 1101 determines the number of processing nodes when the system determines that a total execution time for the requests exceeds a predetermined time value stored in the ingestion service model database 817.

If the processor 1101 determines that the processing nodes auto-scales the number of processing nodes when the system determines that a total execution time for the requests exceeds a predetermined time value stored in the ingestion service model database 817.

In FIG. 8, the time value 804 of the service master queue 801 includes a respective time (in seconds) for each of the request numbers 802. Accordingly, the processor 1101 derives each of the times for each request number and saves the times 804 to memory (e.g., memory 1102, described hereafter with respect to FIG. 11).

According to one embodiment, the processor 1101 derives the amount of time 804 required for each request number 802 by retrieving, via the processor, information from an ingestion service model database 817, as depicted in block 712.

FIG. 8 depicts the ingestion service model database 817. Referring briefly to FIG. 8, the ingestion service model database 817 may be stored in an operatively connected computer storage locally or remotely in a cloud-based location, as described hereafter with respect to FIGS. 9 and 10. The ingestion service model database 817 is a database that associates data store characteristics. The ingestion service model database 817 includes a data store 818, (which can be a description that describes a data store and a unique data store identification, network location of the data store, etc.), and a data store size 820 that is indicative of the respective data storage capacity of each respective data store, and time information (time taken 822) indicative of historical time for a particular data store. According to some embodiments, the data stores 818 can be a type of "Datastore source" such as, for example, Cloudant DB, DashDB, ObjectStorage, Amazon S3 etc. In other aspects, the time taken 822 is the average time taken to process the dataset of the type of data stores 818 of size 820.

According to one embodiment, the auto-scaled number of scaled processing nodes 810 is an optimized value. The value of the number of processing nodes having the capacity to complete all of the requests 803 will not exceed the sum of the plurality of execution times by more than a predetermined optimization value. For example, a predetermined optimization value may be 3%, 2%, 1.5%, etc. This means that the auto-scaled number of processing nodes will be sufficient to perform all of the requests, but not be more than some determined value of threshold over-capacity for processing nodes. By optimizing the auto-scaled processing nodes, the system avoids wasting resources caused by allocating too many processing nodes, while at the same time, ensuring that none of the requests in queue time out.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model can include at least five characteristics, at least four service models, and at least four deployment models.

Characteristics of a Cloud Model

On-demand self-service: a cloud consumer can unilaterally provision computing capabilities, such as server time and network storage, as needed automatically without requiring human interaction with the service's provider.

Broad network access: capabilities are available over a network (e.g., network 1106, as depicted in FIG. 11) and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network (e.g., network 1106, as depicted in FIG. 11), servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks (e.g., network 1106, as depicted in FIG. 11), servers, operating systems, or storage, but has control over the deployed applications and possibly application hosting environment configurations.

Infrastructure as a Service (IaaS): the capability provided to the consumer is to provision processing, storage, networks (e.g., network 1106, as depicted in FIG. 11), and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Database as a Service (DBaaS): a cloud-based approach to the storage and management of structured data that delivers database functionality similar to what is found in relational database management systems (RDBMSes) such as, for example, SQL Server, MySQL, and Oracle. DBaaS provides a flexible, scalable, on-demand platform oriented toward self-service and database management, particularly in terms of provisioning a business' own environment. DBaaS systems can include monitoring engines to track performance and usage, error monitoring, and data analysis engines.

Deployment Models

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party either locally or remotely.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

Figure 9:
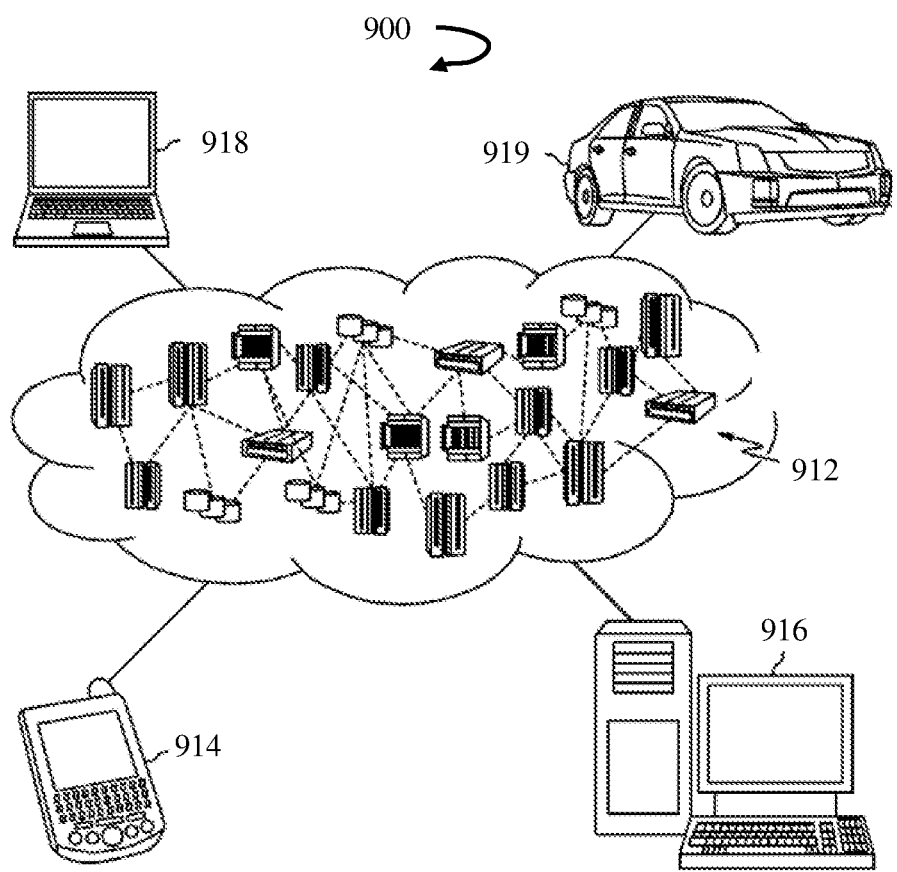
FIG. 9 depicts a cloud computing environment, according to one embodiment.

Referring now to FIG. 9, a cloud computing environment 900 for use in practicing the teachings herein is depicted. As shown in FIG. 9, cloud computing environment 900 comprises one or more cloud computing nodes 912 with which local computing devices used by cloud consumers, such as, for example, a mobile device 914, a desktop computer 916, a laptop computer 918, and/or an automobile computer system 919 can communicate. Cloud computing nodes 912 can communicate with one another. They can be grouped (not shown) physically or virtually, in one or more networks, such as a Private, Community, Public, or Hybrid clouds as described hereinabove, or a combination thereof. This allows cloud computing environment 900 to offer infrastructure, platforms and/or software as services for which a cloud consumer does not need to maintain resources on a local computing device. It is understood that the types of computing devices 914-919 shown in FIG. 9 are intended to be illustrative only and that cloud computing nodes 912 and cloud computing environment 900 can communicate with any type of computerized device over any type of network and/or network addressable connection (e.g., using a web browser).

Figure 10:
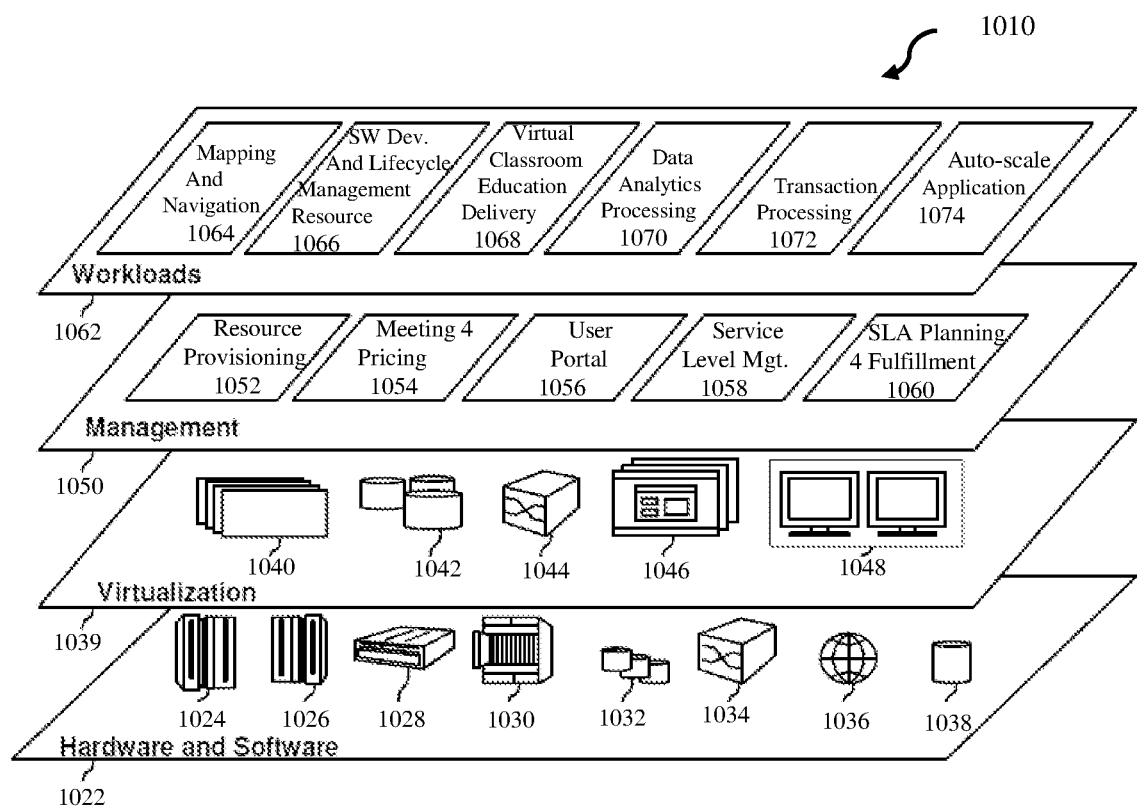
FIG. 10 depicts abstraction model layers according to one embodiment.

Referring now to FIG. 10, a set of functional abstraction layers 1010 provided by cloud computing environment 900 (as depicted in FIG. 9) is shown. It should be appreciated that the components, layers, and functions of functional abstraction layers 1010 depicted in FIG. 10 are illustrative only, and embodiments of the invention are not limited thereto. As depicted, the following layers and corresponding functions are provided:

A hardware and software layer 1022 can include hardware and software components. Examples of hardware components can include, for example, mainframes 1024, 4RISC (Reduced Instruction Set Computer) architecture based servers 1026, servers 1028, blade servers 1030, storage devices 1032, and networks and networking components 1034. In some embodiments, software components include network application server software 1036 and database software 1038.

A virtualization layer 1039 can provide an abstraction layer from which the following examples of virtual entities can be provided: virtual servers 1040, virtual storage 1042, virtual networks 1044, which can include virtual private networks, virtual applications and operating systems 1046, and virtual clients 1048.

In one example, a management layer 1050 can provide the functions described below. A resource provisioning module 1052 can provide dynamic procurement of computing resources and other resources that can be utilized to perform tasks within the cloud computing environment. A metering and pricing resource 1054 can provide cost tracking as resources are utilized within the cloud computing environment, and billing or invoicing for consumption of these resources. In one example, metering and pricing resources can include application software licenses. A user portal 1056 can provide access to cloud computing environment 900 for consumers and system administrators (not shown). In some embodiments, user portal 1056 can provide security and/or identity verification for cloud consumers (e.g., one or more consumers operating one or more of computing devices 914-919) and tasks, as well as protection for data and other resources. A service level management resource 1058 can provide cloud computing resource allocation and management such that required service levels are met. A service level agreement (SLA) planning and fulfillment resource 1060 can provide pre-arrangement for, and procurement of cloud computing resources for which a future requirement is anticipated in accordance with an SLA.

A workloads layer 1062 can provide functionality for which the cloud computing environment can be utilized. For example, workloads layer 1062 can include a mapping and navigation resource 1064, a software development and lifecycle management resource 1066, a virtual classroom education delivery resource 1068, a data analytics processing resource 1070, a transaction processing resource 1072, and an auto-scale application 1074 for auto-scaling predictive analytics.

FIG. 11 illustrates a block diagram of an exemplary computing environment and computer system 1100 for use in practicing the embodiments described herein. The environment and system described herein can be implemented in hardware, software (e.g., firmware), or a combination thereof. In an exemplary embodiment, a hardware implementation can include a microprocessor of a special or general-purpose digital computer, such as a personal computer, workstation, minicomputer, or mainframe computer. Computer 1100, therefore, can embody a general-purpose computer. In another exemplary embodiment, the implementation can be part of a mobile device, such as, for example, a mobile phone, a personal data assistant (PDA), a tablet computer, etc.

As shown in FIG. 11, the computer 1100 includes processor 1101. Computer 1100 also includes memory 1102 communicatively coupled to processor 1101, and one or more input/output adapters 1103 that can be communicatively coupled via system bus 1105. Memory 1102 can be communicatively coupled to one or more internal or external memory devices via a storage interface 1108. Communications adapter 1116 can communicatively connect computer 1100 to one or more networks 1106. System bus 1105 can communicatively connect one or more user interfaces via input/output (I/O) adapter 1103. I/O adapter 1103 can connect a plurality of input devices 1104 to computer 1100. Input devices can include, for example, a keyboard, a mouse, a microphone, a sensor, etc. System bus 1105 can also communicatively connect one or more output devices 1107 via I/O adapter 1103. Output device 1107 can include, for example, a display, a speaker, a touchscreen, etc.

Processor 1101 is a hardware device for executing program instructions (aka software), stored in a computer-readable memory (e.g., memory 1102). Processor 1101 can be any custom made or commercially available processor, a central processing unit (CPU), an auxiliary processor among several other processors associated with the computer 1100, a semiconductor based microprocessor (in the form of a microchip or chip set), or generally any device for executing instructions. Processor 1101 can include a cache memory 1122, which can include, but is not limited to, an instruction cache to speed up executable instruction fetch, a data cache to speed up data fetch and store, and a translation lookaside buffer (TLB) used to speed up virtual-to-physical address translation for both executable instructions and data. Cache memory 1122 can be organized as a hierarchy of more cache levels (L1, L2, etc.).

Processor 1101 can be disposed in communication with one or more memory devices (e.g., ROM 1109, RAM 1110, one or more external databases 1121, etc.) via a storage interface 1108. Storage interface 1108 can also connect to one or more memory devices including, without limitation, one or more databases 1121, and/or one or more other memory drives (not shown) including, for example, a removable disc drive, etc., employing connection protocols such as serial advanced technology attachment (SATA), integrated drive electronics (IDE), IEEE-1394, universal serial bus (USB), fiber channel, small computer systems interface (SCSI), etc. The memory drives can be, for example, a drum, a magnetic disc drive, a magneto-optical drive, an optical drive, a redundant array of independent disks (RAID), a solid-state memory device, a solid-state drive, etc. Variations of memory devices can be used for implementing, for example, list all databases from other figures.

Memory 1102 can include random access memory (RAM) 1110 and read only memory (ROM) 1109. RAM 1110 can be any one or combination of volatile memory elements (e.g., DRAM, SRAM, SDRAM, etc.). ROM 1109 can include any one or more nonvolatile memory elements (e.g., erasable programmable read only memory (EPROM), flash memory, electronically erasable programmable read only memory (EEPROM), programmable read only memory (PROM), tape, compact disc read only memory (CD-ROM), disk, cartridge, cassette or the like, etc.). Moreover, memory 1102 can incorporate electronic, magnetic, optical, and/or other types of non-transitory computer-readable storage media. Memory 1102 can also be a distributed architecture, where various components are situated remote from one another but can be accessed by processor 1101.

The instructions in memory 1102 can include one or more separate programs, each of which can include an ordered listing of computer-executable instructions for implementing logical functions. In the example of FIG. 11, the instructions in memory 1102 can include an operating system 1111. Operating system 1111 can control the execution of other computer programs and provides scheduling, input-output control, file and data management, memory management, and communication control and related services.

The program instructions stored in memory 1102 can further include application data 1112 and for a user interface 1113.

Memory 1102 can also include program instructions for an auto-scale engine 1114, configured to perform one or more auto-scaling operations as described herein.

I/O adapter 1103 can be, for example, but not limited to, one or more buses or other wired or wireless connections. I/O adapter 1103 can have additional elements (which are omitted for simplicity) such as controllers, microprocessors, buffers (caches), drivers, repeaters, and receivers, which can work in concert to enable communications. Further, I/O adapter 1103 can facilitate address, control, and/or data connections to enable appropriate communications among the aforementioned components.

I/O adapter 1103 can further include a display adapter coupled to one or more displays. I/O adapter 1103 can be configured to operatively connect one or more input/output (I/O) devices 1104/1107 to computer 1100. For example, I/O adapter 1103 can connect a keyboard and mouse, a touchscreen, a speaker, a haptic output device, or other output device. Output devices 1107 can include but are not limited to a printer, a scanner, and/or the like. Other output devices can also be included, although not shown. Finally, the I/O devices connectable to I/O adapter 1103 can further include devices that communicate both inputs and outputs, for instance but not limited to, a network interface card (MC) or modulator/demodulator (for accessing other files, devices, systems, or a network), a radio frequency (RF) or other transceiver, a telephonic interface, a bridge, a router, and the like.

According to some embodiments, computer 1100 can include a mobile communications adapter 1123. Mobile communications adapter 1123 can include GPS, cellular, mobile, and/or other communications protocols for wireless communication.

In some embodiments, computer 1100 can further include communications adapter 1116 for coupling to a network 1106.

Network 1106 can be an IP-based network for communication between computer 1100 and any external device. Network 1106 transmits and receives data between computer 1100 and devices and/or systems external to computer 1100. In an exemplary embodiment, network 1106 can be a managed IP network administered by a service provider. Network 1106 can be a network internal to an aircraft, such as, for example, an avionics network, etc. Network 1106 can be implemented in a wireless fashion, e.g., using wireless protocols and technologies, such as WiFi, WiMax, etc.

Network 1106 can also be a wired network, e.g., an Ethernet network, an ARINC 1029 network, a controller area network (CAN), etc., having any wired connectivity including, e.g., an RS232 connection, R5422 connection, etc. Network 1106 can also be a packet-switched network such as a local area network, wide area network, metropolitan area network, Internet network, or other similar type of network environment. The network 1106 can be a fixed wireless network, a wireless local area network (LAN), a wireless wide area network (WAN) a personal area network (PAN), a virtual private network (VPN), intranet or other suitable network system.

Network 1106 can operatively connect computer 1100 to one or more devices including display 1117 and graphics processing unit 1118. Network 1106 can also connect computer 1100 to one or more servers.

If computer 1100 is a PC, workstation, laptop, tablet computer and/or the like, the instructions in the memory 1102 can further include a basic input output system (BIOS) (omitted for simplicity). The BIOS is a set of routines that initialize and test hardware at startup, start operating system 1111, and support the transfer of data among the operatively connected hardware devices. The BIOS is typically stored in ROM 1109 so that the BIOS can be executed when computer 1100 is activated. When computer 1100 is in operation, processor 1101 can be configured to execute instructions stored within the memory 1102, to communicate data to and from the memory 1102, and to generally control operations of the computer 1100 pursuant to the instructions.

The present invention can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for creating an auto-scaled predictive analytics model comprising:
   determining, via a processor, whether a queue size of a service master queue is greater than zero;
   responsive to determining that the queue size is greater than zero, fetching, via the processor, a count of requests in a plurality of requests in the service master queue, and a type for each of the requests;
   deriving via the processor, a respective value for time required for each of the requests;
   retrieving, via the processor, a number of available processing nodes based on the value for time required for each of the requests;
   auto-scaling, via the processor, a processing node number using backpropagation machine learning and responsive to determining that a total execution time for all of the requests in the plurality of requests in the service master queue exceeds a predetermined time value; and
   outputting, via the processor, an auto-scaled predictive analytics model based on the processing node number and queue size,
   wherein auto-scaling the processing node number using backpropagation machine learning and responsive to determining that a total execution time for all of the requests in the plurality of requests in the service master queue exceeds a predetermined time value comprises:
      retrieving the predetermined time value stored in an operatively connected computer memory;
      retrieving, from the master queue, respective execution times for each request of the plurality of requests in the service master queue to obtain a plurality of execution times associated with each of the requests;
      summing the plurality of execution times associated with each of the requests;
      evaluating, via the processor, whether a sum of the plurality of execution times exceeds the predetermined time value; and
      auto-scaling the processing node number responsive to determining that a total execution time for all of the requests in the plurality of requests exceeds a predetermined time value, and
   wherein a value for a number of processing nodes having capacity to complete all of the requests in the plurality of requests in the service master queue is automatically adjusted to satisfy a predetermined over-capacity value such that the value of the number of processing nodes exceeds a sum of the plurality of execution times by no more than 3%.

2. The computer-implemented method of claim 1, further comprising storing, in an operatively connected computer memory, the value for time required for each of the requests in the plurality of requests in the service master queue.

3. The computer-implemented method of claim 2, wherein the predetermined time value for each of the requests in the plurality of requests in the service master queue changes dynamically with respect to time.

4. The computer-implemented method of claim 1, wherein deriving the value for time required for each of the requests comprises accessing, via the processor, an ingestion service model comprising a data store value, a data size value associated with the data store value, and a time taken value associated with the data store value.

5. The computer-implemented method of claim 1, wherein auto-scaling the processing node number using backpropagation machine learning and responsive to determining that the total execution time for all of the requests in the plurality of requests in the service master queue exceeds a predetermined time value comprises writing, via the processor, to a computer memory, the value for the number of processing nodes having capacity to complete all of the requests in the plurality of requests in the service master queue.

6. A system for creating an auto-scaled predictive analytics model comprising:
   a processor configured to:
      determine whether a queue size of a service master queue is greater than zero;
      responsive to determining that the queue size is greater than zero, fetch a count of requests in a plurality of requests in the service master queue, and a type for each of the requests;
      derive a respective value for time required for each of the requests;
      retrieve a number of available processing nodes based on the value for time required for each of the requests;
      auto-scale a processing node number using backpropagation machine learning and responsive to determining that a total execution time for all of the requests in the plurality of requests in the service master queue exceeds a predetermined time value; and
      output an auto-scaled predictive analytics model based on the processing node number and queue size,
   wherein auto-scaling the processing node number using backpropagation machine learning and responsive to determining that a total execution time for all of the requests in the plurality of requests in the service master queue exceeds a predetermined time value comprises:
  retrieving the predetermined time value stored in an operatively connected computer memory;
  retrieving, from the master queue, respective execution times for each request of the plurality of requests in the service master queue to obtain a plurality of execution times associated with each of the requests;
  summing the plurality of execution times associated with each of the requests;
  evaluating whether a sum of the plurality of execution times exceeds the predetermined time value; and
  auto-scaling the processing node number responsive to determining that a total execution time for all of the requests in the plurality of requests exceeds a predetermined time value, and
wherein a value for a number of processing nodes having capacity to complete all of the requests in the plurality of requests in the service master queue is automatically adjusted to satisfy a predetermined over-capacity value such that the value of the number of processing nodes exceeds a sum of the plurality of execution times by no more than 3%.

7. The system of claim 6, further comprising storing, in an operatively connected computer memory, the value for time required for each of the requests in the plurality of requests in the service master queue.

8. The system of claim 7, wherein the predetermined time value for each of the requests in the plurality of requests in the service master queue changes dynamically with respect to time.

9. The system of claim 6, wherein deriving the value for time required for each of the requests comprises accessing an ingestion service model comprising a data store value, a data size value associated with the data store value, and a time taken value associated with the data store value.

10. The system of claim 6, wherein auto-scaling the processing node number using backpropagation machine learning and responsive to determining that the total execution time for all of the requests in the plurality of requests in the service master queue exceeds a predetermined time value comprises writing to a computer memory, the value for the number of processing nodes having capacity to complete all of the requests in the plurality of requests in the service master queue.

11. A computer program product for creating an auto-scaled predictive analytics model, the computer program product comprising a computer readable storage medium having program instructions embodied therewith, the program instructions executable by a processor to cause the processor to perform a method comprising:
  determining whether a queue size of a service master queue is greater than zero;
  responsive to determining that the queue size is greater than zero, fetching a count of requests in a plurality of requests in the service master queue, and a type for each of the requests;
  deriving a respective value for time required for each of the requests;
  retrieving a number of available processing nodes based on the time required for each of the requests;
  auto-scaling a processing node number using backpropagation machine learning and responsive to determining that a total execution time for all of the requests in the plurality of requests in the service master queue exceeds a predetermined time value; and
  outputting an auto-scaled predictive analytics model based on the processing node number and queue size,
  wherein auto-scaling the processing node number using backpropagation machine learning and responsive to determining that a total execution time for all of the requests in the plurality of requests in the service master queue exceeds a predetermined time value comprises:
    retrieving the predetermined time value stored in an operatively connected computer memory;
    retrieving, from the master queue, respective execution times for each request of the plurality of requests in the service master queue to obtain a plurality of execution times associated with each of the requests;
    summing the plurality of execution times associated with each of the requests;
    evaluating whether a sum of the plurality of execution times exceeds the predetermined time value; and
    auto-scaling the processing node number responsive to determining that a total execution time for all of the requests in the plurality of requests exceeds a predetermined time value, and
  wherein a value for a number of processing nodes having capacity to complete all of the requests in the plurality of requests in the service master queue is automatically adjusted to satisfy a predetermined over-capacity value such that the value of the number of processing nodes exceeds a sum of the plurality of execution times by no more than 3%.

12. The computer program product of claim 11, further comprising storing, in an operatively connected computer memory, the value for time required for each of the requests in the plurality of requests in the service master queue.

13. The computer program product of claim 12, wherein the predetermined time value for each of the requests in the plurality of requests in the service master queue changes dynamically with respect to time.

14. The computer program product of claim 11, wherein deriving the value for time required for each of the requests comprises accessing an ingestion service model comprising a data store value, a data size value associated with the data store value, and a time taken value associated with the data store value.

15. The computer program product of claim 11, wherein auto-scaling the processing node number using backpropagation machine learning and responsive to determining that the total execution time for all of the requests in the plurality of requests in the service master queue exceeds the predetermined time value comprises writing to a computer memory, the value for the number of processing nodes having capacity to complete all of the requests in the plurality of requests in the service master queue.

* * * * *